(12) United States Patent
McCluskey et al.

(10) Patent No.: US 9,035,595 B2
(45) Date of Patent: May 19, 2015

(54) INTEGRAL ELECTRIC POWER/COMPACT CONSTRUCTION EQUIPMENT SYSTEM

(75) Inventors: Philip H. McCluskey, Plainfield, IL (US); Reid W. Waitt, Four Oaks, NC (US); Mary H. Bell, Cary, NC (US)

(73) Assignee: Caterpillar Inc., Peoria, IL (US)

( * ) Notice: Subject to any disclaimer, the term of this patent is extended or adjusted under 35 U.S.C. 154(b) by 732 days.

(21) Appl. No.: 13/172,247

(22) Filed: Jun. 29, 2011

(65) Prior Publication Data

US 2013/0002198 A1 Jan. 3, 2013

(51) Int. Cl.
*H02J 7/00* (2006.01)
*H02J 7/16* (2006.01)
*B60L 11/18* (2006.01)
*H02J 7/32* (2006.01)

(52) U.S. Cl.
CPC ........... *B60L 11/1816* (2013.01); *H02J 7/0031* (2013.01); *H02J 7/0054* (2013.01); *H02J 7/32* (2013.01); *B60L 2200/40* (2013.01); *Y02T 10/7088* (2013.01); *Y02T 10/7005* (2013.01); *Y02T 90/121* (2013.01); *Y02T 90/14* (2013.01)

(58) Field of Classification Search
CPC ..... H02J 7/0027; H02J 7/0021; H02J 7/0026; H02J 7/0003; H02J 7/0013; H02J 7/0042; H02J 7/0044; H02J 7/0045
USPC .................. 320/107, 104, 103, 137
See application file for complete search history.

(56) References Cited

U.S. PATENT DOCUMENTS

| | | | |
|---|---|---|---|
| 3,883,794 A | 5/1975 | Sivley | |
| 5,963,013 A * | 10/1999 | Watson et al. | 320/107 |
| 6,652,330 B1 * | 11/2003 | Wasilewski | 440/1 |
| 6,678,972 B2 | 1/2004 | Naruse et al. | |
| 7,147,070 B2 | 12/2006 | Leclerc et al. | |
| 7,193,393 B1 * | 3/2007 | Payne | 320/119 |
| 7,279,640 B2 * | 10/2007 | White et al. | 174/135 |
| 7,497,457 B2 | 3/2009 | Jamieson | |
| 7,497,757 B2 * | 3/2009 | Hamasaki | 446/78 |
| 7,514,803 B2 | 4/2009 | Wilks | |
| 7,823,902 B2 | 11/2010 | Jamieson | |
| 2002/0163196 A1 * | 11/2002 | Brofft et al. | 290/1 A |
| 2012/0112693 A1 * | 5/2012 | Kusch et al. | 320/109 |

FOREIGN PATENT DOCUMENTS

DE 19952813 8/2000

* cited by examiner

*Primary Examiner* — Drew A Dunn
*Assistant Examiner* — Alexis A Boateng
(74) *Attorney, Agent, or Firm* — Miller, Matthias & Hull LLP

(57) ABSTRACT

A system and method for charging a rechargeable battery for a vehicle are disclosed. The system may comprise an electrical generation apparatus that is a source of electric charge, a mobile unit to transport a vehicle, and a tie down having an input end and an output end. The tie down may be configured to releasably secure the vehicle to the mobile unit and to provide electrical charge generated by the electrical generation apparatus to the battery.

9 Claims, 5 Drawing Sheets

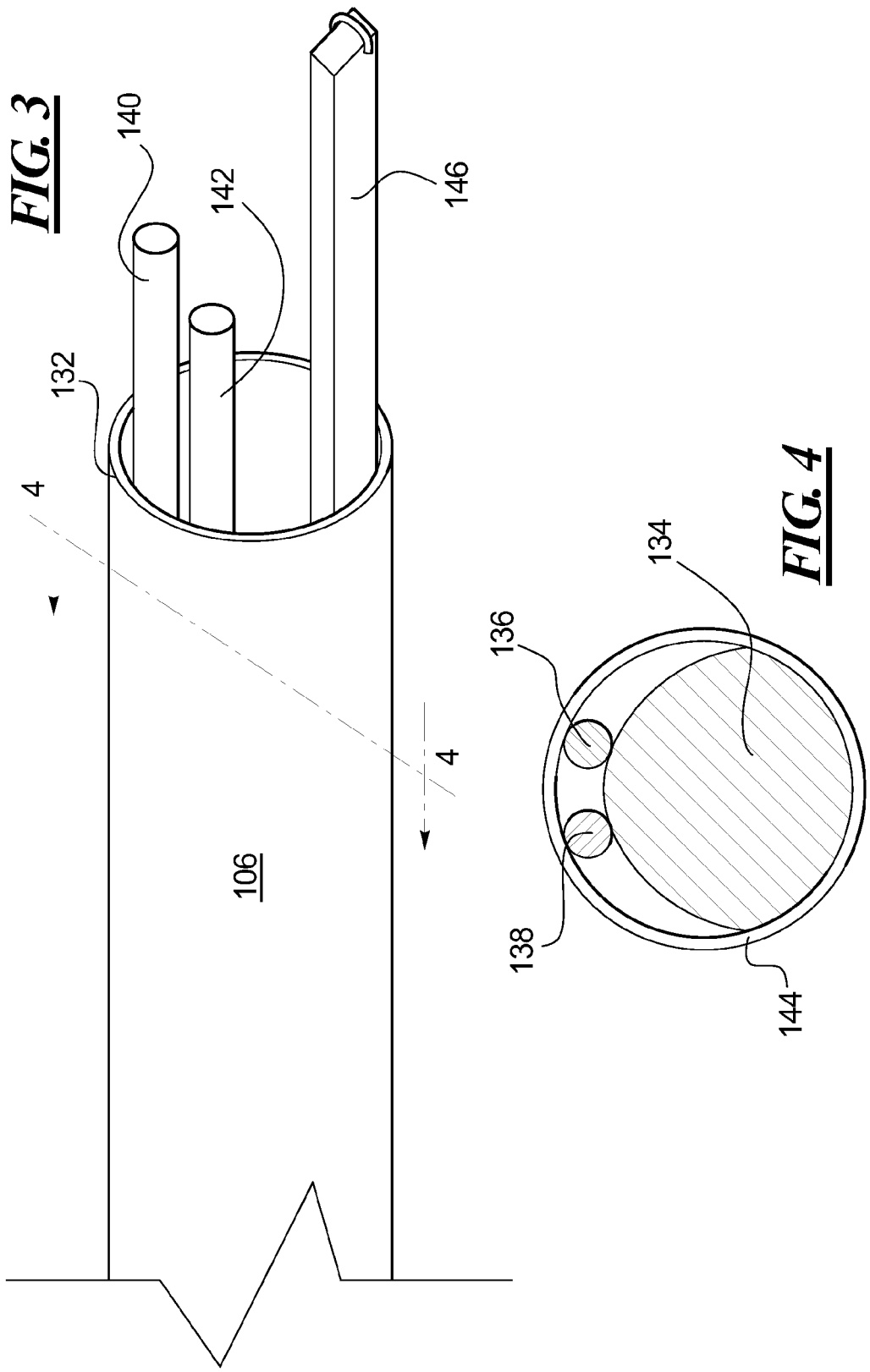

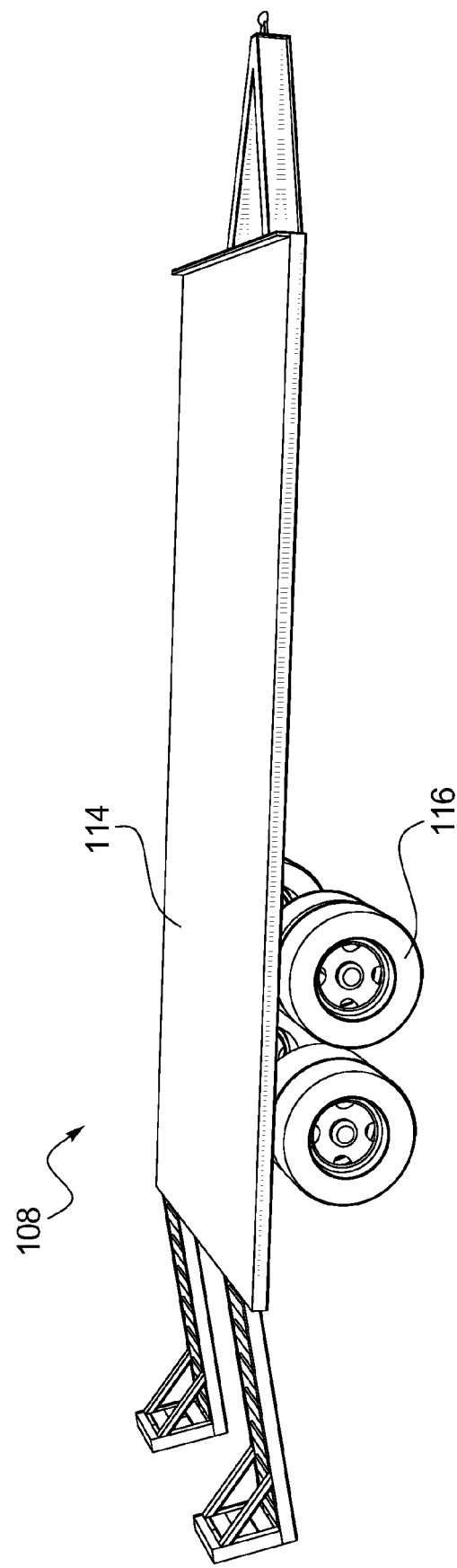

INTEGRAL ELECTRIC POWER/COMPACT CONSTRUCTION EQUIPMENT SYSTEM

TECHNICAL FIELD

The present disclosure generally relates to a system for transporting and charging a vehicle that uses a rechargeable battery and, more particularly, relates to electrical generation systems for charging batteries for use with compact earth moving, construction, material handling vehicles, and the like.

BACKGROUND

Use of vehicles such as compact excavators, forktrucks, wheel loaders, and the like for material handling, digging trenches, snow removal, and other material handling, construction, earth moving and maintenance applications is known. Typically these vehicles utilize combustion engines that generate exhaust gases and unwelcome loud operating noise. Use of such vehicles may also result in spilled fuel during operation or refueling of the vehicle engine.

While the compact size of such vehicles makes them ideal for indoor use, the resulting exhaust gases, noise and fuel spillage makes these vehicles undesirable for indoor use, in urban areas, "green" construction sites, or in areas with stringent environmental regulations. It would be desirable to use electric powered compact vehicles for such industrial, residential or commercial indoor or outdoor sites. Because the batteries on these vehicles need to be charged prior to use, it would be beneficial if the batteries were charged during transportation to and from the site, were able to be recharged at the site, and were easily interchangeable between multiple pieces of equipment at the site.

U.S. Pat. No. 7,514,803 ("Wilks"), issued Apr. 7, 2009, is an example of prior art related to electrical power generation and storage devices for portable or emergency use. FIG. 1 of Wilks illustrates an apparatus comprises a towable trailer that incorporates a wheel driven electrical power generation apparatus used to charge a battery when the trailer is pulled and the wheels rotate within a optimum range. Batteries (e.g. chemical batteries) are placed on the trailer bed for transportation and charging. While this design may provide for charging of batteries during transportation, it does not address how these batteries are secured to the trailer bed during transportation and disadvantageously makes no provision for securing a vehicle to the trailer for transportation of the vehicle and charging of a battery in the vehicle during such transportation. A more efficient design would be desirable.

SUMMARY OF DISCLOSURE

In accordance with one aspect of the disclosure, a system for transporting and charging a rechargeable battery is disclosed. The system may comprise an electrical generation apparatus that is a source of electric charge, a mobile unit including a trailer portion, the mobile unit configured to transport a first vehicle, and a tie down having an input end and an output end. The tie down may be attached to the trailer portion and may be configured to releasably secure the first vehicle to the trailer portion. The input end of the tie down may be electrically connected to the electrical generation apparatus, and generation apparatus and the output end may be configured to be electrically connected to the battery to provide electrical charge to the battery.

In accordance with another aspect of the disclosure, an apparatus for transporting a first vehicle is disclosed. The apparatus may comprise an electrical generation apparatus that is a source of electric charge, a truck, a trailer portion attached to the truck, the trailer portion including a bed, a first vehicle disposed on the bed, and a first tie down attached to the trailer portion and configured to releasably secure the first vehicle to the trailer portion. The first vehicle may include a frame, a first rechargeable battery disposed on the frame, and a first mount. The first tie down may have a first input end and a first output end. The first input end may be electrically connected to the electrical generation apparatus and the first output end may be electrically connected to the first battery and configured to provide electric charge to the battery.

In accordance with a further aspect of the disclosure, a method of charging a battery for a vehicle is disclosed. The method may comprise providing an electrical generation apparatus configured to generate electrical charge, a trailer portion having a bed, a first vehicle disposed on the bed, and a tie down, the first vehicle including a frame, a rechargeable battery disposed on the frame and a mount, the tie down including an input end and an output end, the input end electrically connected to the electrical generation apparatus and the output end configured to be attached to the mount of the vehicle and to be electrically connected to the battery. The method may further include releasably securing the vehicle to the trailer portion with the output end of the tie down, electrically connecting the output end to the battery, generating electrical charge by operating the electrical generation apparatus, and charging the battery via the output end of the tie down with charge that results from the generating step.

BRIEF DESCRIPTION OF THE DRAWINGS

FIG. 3 is a perspective view of an exemplary tie down;

FIG. 4 is a section view of the tie down of FIG. 3 taken along the lines 4-4;

FIG. 6 is a perspective view of another embodiment of the trailer portion.

DETAILED DESCRIPTION

Figure 1:
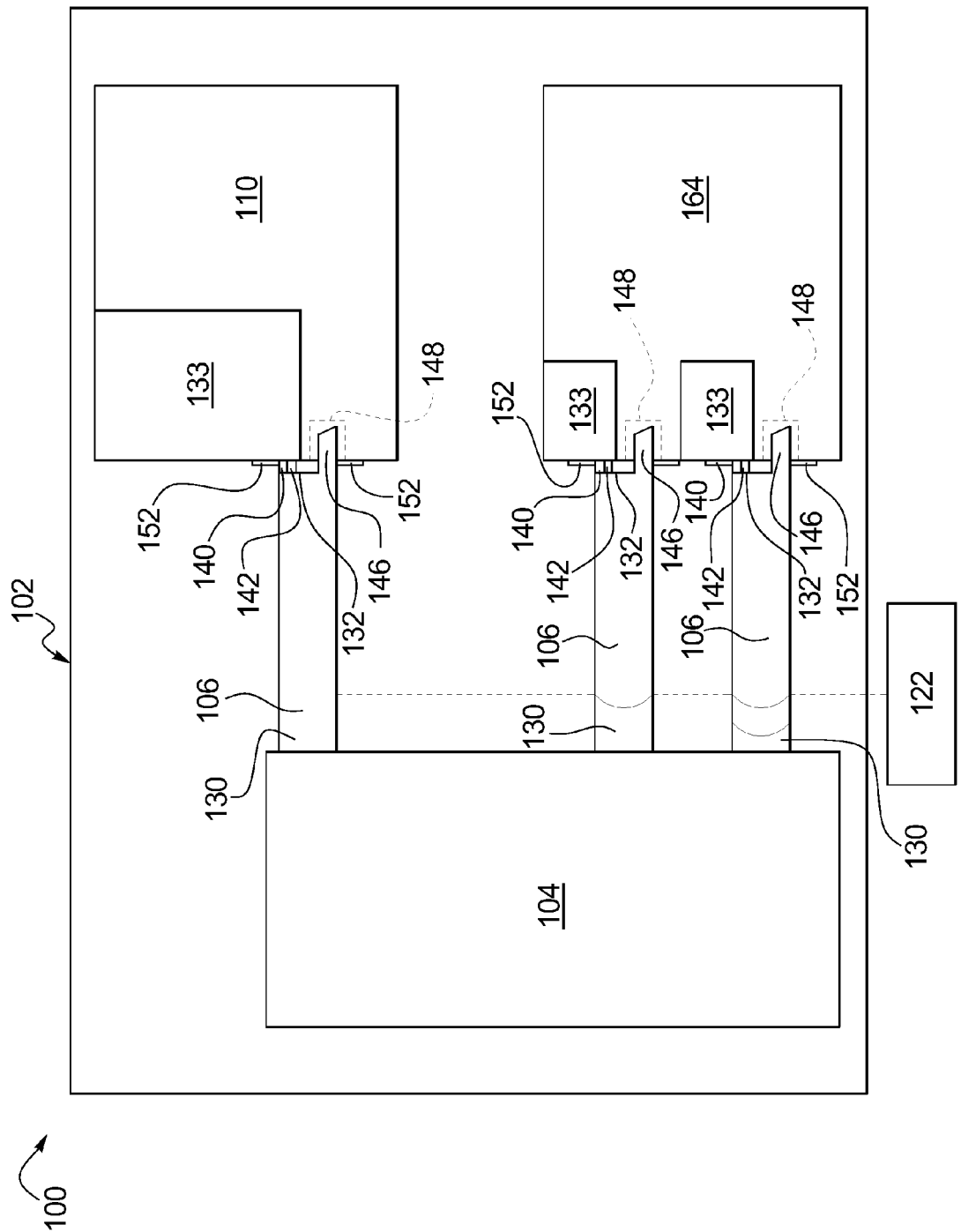
FIG. 1 is a schematic of an embodiment of a system for charging a battery.

Referring now to the drawings, and with specific reference to FIG. 1, there is shown an embodiment of a system in accordance with the present disclosure. The system is generally referred to by reference numeral 100. The system 100 may comprise a mobile unit 102, an electrical generation apparatus 104 disposed on or inside the mobile unit 102, and a tie down 106.

Figure 2:
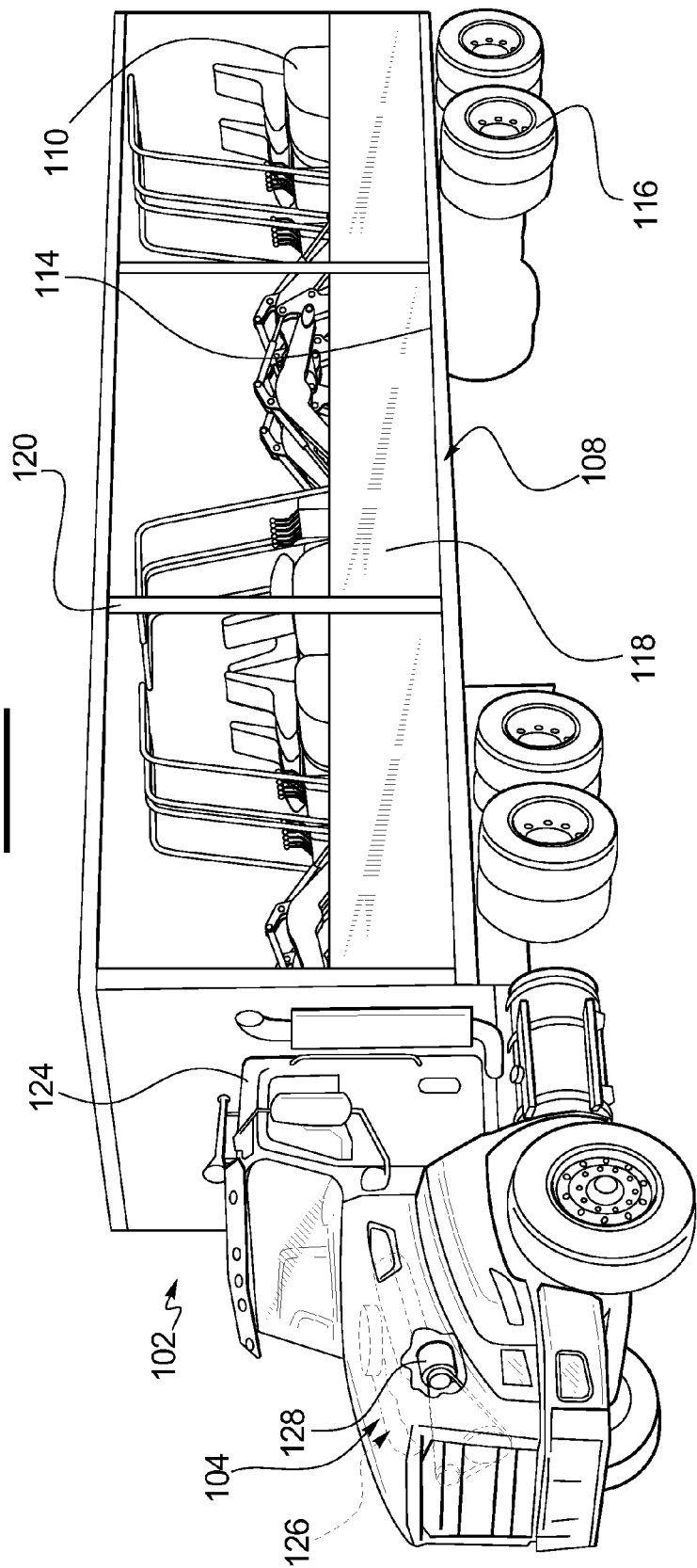
FIG. 2 is a perspective view of one embodiment of a mobile unit in accordance with the teachings of this disclosure.

FIG. 2 illustrates one embodiment of a mobile unit 102. In the embodiment illustrated in FIG. 2, the mobile unit 102 may include a trailer portion 108. The trailer portion 108 is configured to transport a vehicle 110 and may include a bed 114 and wheels 116 disposed on the underside of the bed 114. In some embodiments, the trailer portion 108 may be configured to transport a plurality of vehicles 110 and may have a plurality of tie downs 106 arranged in a one to one correspondence with the vehicles 110. The trailer portion 108 may include one or more sides 118. The sides 118 may extend upward from the bed 114 or may extend generally horizontally from support posts 120 disposed along the perimeter of the bed 114 of the trailer portion 108. In other embodiments of the trailer portion 108, such as the embodiment illustrated in FIG. 6, the trailer portion 108 may not include sides 118, support posts 120 or a roof.

The mobile unit 102 may further include a hauling vehicle 124 such as a truck, dump truck, utility vehicle, industrial vehicle, or the like. FIG. 2 is a perspective view of one example of a mobile unit 102 that includes both a truck 124 and a trailer portion 108. In the embodiment illustrated in FIG. 2, the truck 124 may be connected to the trailer portion 108 by a hitch and is configured to tow the trailer portion 108. In other embodiments of the mobile unit 102, the hauling vehicle 124 and the trailer portion may be integral instead of separate components. A flat bed truck is one example of such an integral mobile unit 102.

The electrical generation apparatus 104 is a source of electrical charge. It may be an electrical generator, as is known in the art, mounted on, or disposed in, the mobile unit 102. In one embodiment, the electrical generation apparatus 104 may be mounted on the trailer portion 108. In other embodiments, the electrical generation apparatus 104 may be disposed in the hauling vehicle 124, for example a truck. The electrical generation apparatus 104 disposed in the hauling vehicle 124 may be an electrical generator configured to produce electrical energy as is known in the art. Alternatively, in a different embodiment, the electrical generation apparatus 104 disposed in the hauling vehicle 124 may comprise the engine assembly 126 of the hauling vehicle 124 and an alternator 128. The engine assembly 126 may be configured to produce mechanical energy, as is known in the art. The alternator 128 may be connected to the engine assembly 126 and may be configured to convert mechanical energy received from the engine assembly 126 into electrical energy as is known in the art.

The tie down 106 (FIG. 1) may have an input end 130 and an output end 132. The tie down 106 may be attached to the trailer portion 108 and configured to releasably secure a vehicle 110 to the trailer portion 108. The input end 130 of the tie down 106 may be electrically connected to the electrical generation apparatus 104. The output end 132 of the tie down 106 may be configured to be connected to both a vehicle 110 (disposed on the trailer bed) and (electrically connected) to a rechargeable battery 133 disposed in the vehicle. The tie down 106 is configured to provide electrical charge generated by the electrical generation apparatus 104 to the rechargeable battery 133.

In one embodiment in which the electrical generation apparatus 104 comprises a truck engine 126 and an alternator 128, the alternator 128 may be connected, directly or indirectly, to the input end 130 of the tie down 106. In a different embodiment in which the electrical generation apparatus 104 is an electrical generator, the input end 130 of the tie down 106 may be connected, directly or indirectly, to the electrical generator.

The tie down 106 may be mounted on the trailer portion 108. In one embodiment, the tie down 106 may be mounted to a side 118 of the trailer portion 108. In another embodiment, the tie down 106 may be mounted to the bed 114 of the trailer portion 108 and may secure the vehicle 110 being transported from underneath. Other appropriate locations for mounted the tie down 106 to the trailer portion 108 are possible.

FIGS. 3-4 illustrate one embodiment of the tie down 106. The tie down 106 may further comprise a restraint member 134, a first electrical cable 136 and a second electrical cable 138. Herein, the term "electrical cable" means any conduction member used to carrying electrical charge, as is known in the art. For example, an electrical cable may be one or more metal wires, or the like.

A first lead 140 may be attached to the first electrical cable 136 at the output end 132 of the tie down 106. A second lead 142 may be attached to the second electrical cable 138 at the output end 132 of the tie down 106. In some embodiments, the tie down may also comprise a conduit 144. The conduit 144 may substantially surround or wrap the restraint member 134 and the first and second electrical cables 136, 138. The first and second electrical cables 136, 138 may be disposed adjacent to the restraint member 134.

The restraint member 134 may be flexible. For example, the restraint member 134 may be, but is not limited to, a wire, a plurality of wires, a non-electrical cable, a chain, a rope, or the like. In other embodiments, the restraint member 134 may be rigid in form, for example, cast metal or resin, or the like. In embodiments in which the restraint member 134 is rigid, fasteners may hold the first and electrical cables 136, 138 to the restraint member 134 and the conduit 144 may, or may not be present, in the tie down 106. Additionally, in some embodiments, the first and second electric cables 136, 138 may be routed through an interior channel formed in the restraint member 134.

The restraint member 134 may comprise a connector 146 disposed at the output end 132 of the tie down 106. The connector 146 may be any of a variety of appropriate connector 146 known in the art. The connector 146 may be configured to be releasably attached to a receiving member 148 disposed on a mount 152 on the frame 150 of the vehicle 110 to be transported by the trailer portion 108. In the embodiment illustrated in FIG. 3, the connector 146 is a male prong-like connector 146 and the receiving member 148 (FIG. 1) may be a reciprocal receptacle that lockingly receives the male connector 146. Other types of connectors 146 and receiving members 148 may be utilized. For example, the connector 146 may be a hook that locks onto a receiving member 148 that is shaped similar to a loop.

Figure 5:
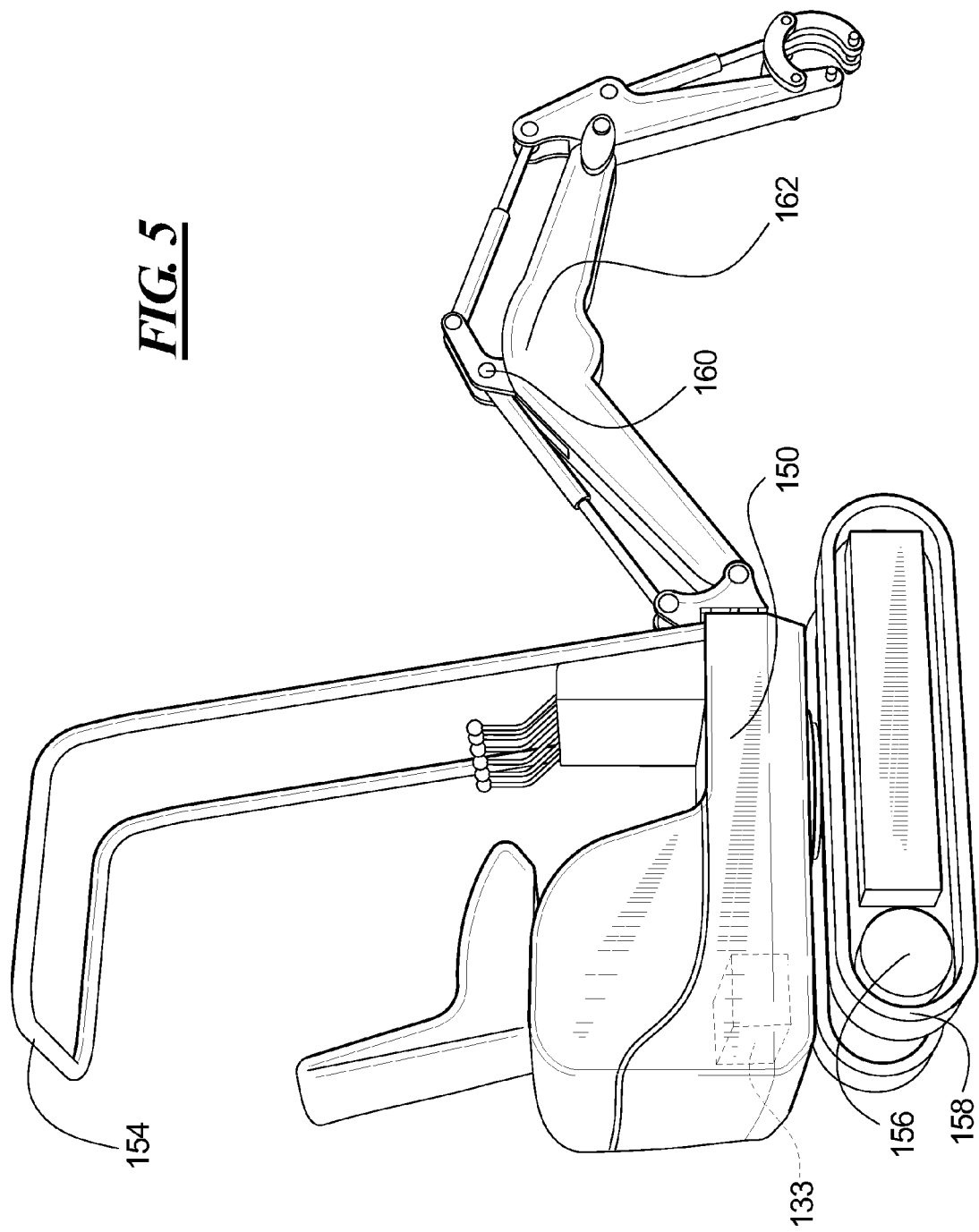
FIG. 5 is a perspective view of one embodiment of an exemplary vehicle, including a rechargeable battery, that may be transported and the battery recharged by the mobile unit of FIG. 2.

FIG. 5 illustrates one example of a vehicle 110 that may be transported by the mobile unit 102. The vehicle 110 may include a frame 150, a cab assembly 154, a rechargeable battery 133, one or more axle assemblies 156, and drive train components (not shown) mounted to the frame 150. The rechargeable battery 133 may be mounted on the frame 150. Tracks 158, wheels or the like, may be mounted to the axle assembly 156. A boom assembly 160 and a lift arm assembly 162 may be mounted on the frame 150. An implement (not shown) may be attached to the boom assembly 160 and to the lift arm assembly 162. The frame 150 of the vehicle 110 may include a mount 152 (FIG. 1) that has a receiving member 148 disposed on or therein. The receiving member 148 may be configured to receive the connector 146 of the tie down 106 such that the vehicle 110 is substantially held in place on the trailer portion 108 during movement of the trailer portion 108.

The output end 132, more specifically the connector 146, of the first tie down 106 is configured to lockingly fasten to the vehicle 110 and in doing so releasably secure the vehicle 110 to the trailer portion 108. In some embodiments, the tie down 106, when fastened to the vehicle 110, substantially immobilizes the vehicle 110 with respect to the trailer portion 108. The output end 132 of the tie down 106 is electrically connected to the rechargeable battery 133 via the first and second electrical cables 136, 138. Specifically, the first lead 140 of the first electrical cable 136 may be connected, either directly or indirectly, to a first terminal of the rechargeable battery 133. The second lead 142 of the second electrical cable 138 may be connected, either directly or indirectly, to a second terminal of the rechargeable battery 133.

The mobile unit 102 may also include a rack 164 (FIG. 1) for storing and transporting one or more spare rechargeable batteries 133. The rack 164 may be mounted to the mobile unit 102, the trailer portion 108 of the mobile unit 102, or in some embodiments to the hauling vehicle or truck 124 of the mobile unit 102. In one embodiment of the mobile unit 102, a rack 164 with at least one rechargeable battery 133 disposed in the rack 164 may be disposed on the bed 114 of the trailer portion 108, or other appropriate part of the trailer portion 108 of the mobile unit 102. A tie down 106, attached to the trailer portion 108, may be connected at the input end 130 to the electrical generation apparatus 104. The output end 132 of the tie down 106 may be configured to releasably secure the rack 164 to the trailer portion 108. The output end 132 may also be configured to be electrically connected to the rechargeable battery 133 in the rack 164 via the first and second leads 140, 142 and, thus the tie down 106 may provide electric charge generated by the electrical generation apparatus 104 to the rechargeable battery 133 in the rack 164. The tie down 106 may also provide electric charge generated by the electrical generation apparatus 104 to a plurality of rechargeable batteries 133 in the rack 164 via electrical distribution wiring disposed on the rack 164.

As illustrated in FIG. 1, in some embodiments one or more tie downs 106 may be electrically connected, either directly or indirectly to a power source 122 that is not part of the mobile unit 102, such as a land based power source at a work site. The mobile unit 102 may be configured to provide electrical charge from the power source 122 to the rechargeable battery 133 or batteries 133 via the tie down(s) 106. This may be particularly beneficial for overnight or off-shift charging of the rechargeable battery 133 or batteries 133 by the power source 122.

INDUSTRIAL APPLICABILITY

The present disclosure may find applicability in the transportation and charging of work vehicles that use rechargeable electric batteries such as those used for indoor use, urban areas, "green" construction sites, or other work sites with stringent environmental pollution and noise regulations.

The mobile unit described above may be utilized to charge a rechargeable battery in a vehicle as the vehicle is being transported to and from a work site or, alternatively, on-site at the work location. Such a mobile unit may also be utilized to charge the batteries in multiple vehicles. In addition, spare rechargeable batteries may also be transported with the work vehicle to the site and may also be charged during transportation or while on-site at the work location.

An input end of a tie down may be may be connected to the trailer of the mobile unit and to the electrical generation apparatus disposed on the mobile unit. The output end of a tie down may be connected to the vehicle to releasably secure the vehicle in place on the trailer. The output end of the tie down may also be electrically connected to the battery disposed in the vehicle. When the electrical generation apparatus is operated, an electrical charge is generated and the battery may then be charged via the transfer of electrical charge generated by the electrical generating apparatus to the battery through the tie down.

In addition to having a tie down configured to charge a first vehicle, the mobile unit may include another tie down to charge a second vehicle or to charge one or more spare batteries disposed in a rack secured to the mobile unit, the trailer portion of the mobile unit or the truck of the mobile unit. The ability to charge a spare battery or batteries is quite beneficial because when the charge in the battery of the vehicle transported to the work site is spent due to use, the spent battery may be conveniently replaced with a charged spare battery. This effectively extends the work availability of the vehicle while on-site. In addition, to the extent that the batteries in a variety of the work vehicles at the work location are interchangeable, the charged spare batteries may also be used to replace such batteries in such other vehicles. In addition, the ability to charge rechargeable batteries with a power source that is not part of the mobile unit, such as a land based power source, allows the batteries to be charged overnight at a work site or off-shift at a work site. This increases the flexibility offered by the system.

The mobile unit may, in some embodiments, transport a plurality of vehicles. In such an embodiment, a plurality of tie downs may be desired, each tie down in a one-to-one correspondence with a vehicle.

In summary, a method is disclosed for providing an electrical generation apparatus configured to generate electrical charge, a trailer portion having a bed, a first vehicle disposed on the bed, and a tie down, the first vehicle including a frame, a rechargeable battery disposed on the frame and a mount, the tie down including an input end and an output end, the input end electrically connected to the electrical generation apparatus and the output end configured to be attached to the mount of the vehicle and to be electrically connected to the battery. The method further includes releasably securing the vehicle to the trailer portion with the output end of the tie down, electrically connecting the output end to the battery, generating electrical charge by operating the electrical generation apparatus, and charging the battery via the output end of the tie down with charge that results from the generating step.

The features disclosed herein may be particularly beneficial to compact excavators, forktrucks, wheel loaders, and the like used for material handling, digging trenches, snow removal, and other material handling, construction, earth moving and maintenance applications at work sites with environmental pollution and noise restrictions or concerns.

What is claimed is:
1. A system for charging a rechargeable battery, the system comprising:
an electrical generation apparatus that is a source of electric charge;
a mobile unit including a trailer portion, the mobile unit configured to transport a first vehicle and a rack, the first vehicle including a frame and a reciprocal receiving receptacle disposed in the frame, the rechargeable battery disposed on the frame;
a first tie down having an input end and an output end, the first tie down including a restraint member extending from the input end to the output end, and first and second electrical cables extending from the input end to the output end and disposed adjacent to the restraint member, the restraint member including a male prong-like connector disposed at the output end of the first tie down, the restraint member different than the first and second electrical cables, the first tie down attached to the trailer portion and the male prong-like connector configured to releasably immobilize the first vehicle to the trailer portion when the male prong-like connector is inserted into the reciprocal receiving receptacle in the frame of the first vehicle, the input end electrically connected to the electrical generation apparatus, and the output end configured to be electrically connected to the rechargeable battery disposed on the frame to provide electrical charge to the rechargeable battery;

the rack mounted on the mobile unit;

a spare rechargeable battery disposed in the rack; and a second tie down, the second tie down having a second tie down input end and a second tie down output end, the second tie down including a second restraint member extending from the second tie down input end to the second tie down output end, and third and fourth electrical cables extending from the second tie down input end to the second tie down output end and disposed adjacent to the second restraint member, the second tie down attached to the trailer portion and configured to releasably secure the rack to the mobile unit, the second tie down input end electrically connected to the electrical generation apparatus, and the second tie down output end configured to be electrically connected to the spare rechargeable battery to provide electrical charge to the spare rechargeable battery.

2. The system of claim 1, wherein the electrical generation apparatus is an electrical generator mounted on the mobile unit.

3. The system of claim 1, in which the mobile unit further includes a truck connected to the trailer portion and configured to tow the trailer portion.

4. The system of claim 3, in which the electrical generation apparatus includes:

an engine assembly disposed in the truck and configured to produce mechanical energy; and an alternator connected to engine assembly and to the input end of the first tie down, the alternator configured to convert mechanical energy received from the engine assembly into electrical charge and to provide the electrical charge to the first tie down.

5. The system of claim 1, in which the trailer portion further comprises a first side, wherein the first tie down is attached to the first side of the trailer portion.

6. The system of claim 1, in which the trailer portion further comprises a bed, wherein the first tie down is attached to the bed of the trailer portion.

7. The system of claim 1, in which the first tie down further comprises a conduit, a first lead attached to the first electrical cable at the output end of the first tie down and a second lead attached to the second electrical cable at the output end of the first tie down, the conduit substantially surrounding the restraint member and the first and second electrical cables, wherein the restraint member is a flexible restraint member.

8. The system of claim 7, in which the trailer portion further comprises a bed and a first side extending upward from the bed, wherein the first tie down is attached to the first side of the trailer portion.

9. The system of claim 1, wherein the restraint member is a substantially rigid restraint member and in which the first tie down further comprises a first lead attached to the first electrical cable at the output end of the first tie down and a second lead attached to the second electrical cable at the output end of the first tie down.

* * * * *

UNITED STATES PATENT AND TRADEMARK OFFICE
CERTIFICATE OF CORRECTION

PATENT NO.       : 9,035,595 B2                                         Page 1 of 1
APPLICATION NO.  : 13/172247
DATED            : May 19, 2015
INVENTOR(S)      : McCluskey et al.

It is certified that error appears in the above-identified patent and that said Letters Patent is hereby corrected as shown below:

Claims

Column 8, line 24, In claim 9, delete "member and" and insert -- member, and --.

Signed and Sealed this
Fifteenth Day of March, 2016

Michelle K. Lee
*Director of the United States Patent and Trademark Office*